US 7,802,186 B2

(12) United States Patent
Burke et al.

(10) Patent No.: US 7,802,186 B2
(45) Date of Patent: Sep. 21, 2010

(54) PROPERTY INDEPENDENT IN-PLACE EDITING

(75) Inventors: Shawn P Burke, Kirkland, WA (US); Jeffrey T Chrisope, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1045 days.

(21) Appl. No.: 10/959,217

(22) Filed: Oct. 6, 2004

(65) Prior Publication Data

US 2006/0075352 A1 Apr. 6, 2006

(51) Int. Cl.
G06F 3/00 (2006.01)
G06F 3/048 (2006.01)

(52) U.S. Cl. .................. 715/709; 715/705; 715/706; 715/707; 715/708; 715/710; 715/711; 715/712; 715/713; 715/714; 715/764; 715/768

(58) Field of Classification Search ............. 715/763, 715/705–715, 764, 768
See application file for complete search history.

(56) References Cited

U.S. PATENT DOCUMENTS

| | | | | | |
|---|---|---|---|---|---|
| 4,772,206 | A | * | 9/1988 | Kerr et al. ................ | 434/118 |
| 5,481,667 | A | * | 1/1996 | Bieniek et al. ............ | 715/709 |
| 5,544,299 | A | * | 8/1996 | Wenstrand et al. ........ | 715/804 |
| 5,687,331 | A | * | 11/1997 | Volk et al. ................ | 715/840 |
| 5,715,415 | A | * | 2/1998 | Dazey et al. .............. | 715/708 |
| 5,760,776 | A | * | 6/1998 | McGurrin et al. ......... | 715/841 |
| 5,781,190 | A | * | 7/1998 | Gorbet et al. ............. | 715/748 |
| 5,825,356 | A | * | 10/1998 | Habib et al. .............. | 715/712 |
| 5,844,554 | A | * | 12/1998 | Geller et al. .............. | 715/744 |
| 5,926,175 | A | * | 7/1999 | Sturgeon et al. .......... | 715/716 |
| 5,956,736 | A | * | 9/1999 | Hanson et al. ............ | 715/513 |
| 5,990,862 | A | * | 11/1999 | Lewis ...................... | 715/858 |
| 6,012,073 | A | * | 1/2000 | Arend et al. .............. | 715/236 |
| 6,037,935 | A | * | 3/2000 | Bates et al. ............... | 715/760 |
| 6,064,821 | A | * | 5/2000 | Shough et al. ............ | 717/174 |
| 6,154,205 | A | * | 11/2000 | Carroll et al. ............. | 345/684 |
| 6,232,957 | B1 | * | 5/2001 | Hinckley .................. | 345/156 |
| 6,233,726 | B1 | * | 5/2001 | Bowman et al. .......... | 717/107 |
| 6,269,475 | B1 | * | 7/2001 | Farrell et al. ............. | 717/113 |
| 6,286,137 | B1 | * | 9/2001 | Bleizeffer et al. ......... | 717/127 |
| 6,333,753 | B1 | * | 12/2001 | Hinckley .................. | 715/768 |
| 6,429,883 | B1 | * | 8/2002 | Plow et al. ................ | 715/768 |
| 6,456,304 | B1 | * | 9/2002 | Angiulo et al. ........... | 715/779 |
| 6,476,831 | B1 | * | 11/2002 | Wirth et al. .............. | 715/784 |
| 6,483,526 | B1 | * | 11/2002 | Merrick .................... | 715/780 |
| 6,573,906 | B1 | * | 6/2003 | Harding et al. ........... | 715/705 |
| 6,587,128 | B2 | * | 7/2003 | Kanevsky et al. ......... | 715/768 |
| 6,614,457 | B1 | * | 9/2003 | Sanada et al. ............. | 715/840 |
| 6,628,311 | B1 | * | 9/2003 | Fang ......................... | 715/777 |
| 6,631,271 | B1 | * | 10/2003 | Logan ..................... | 455/456.1 |

(Continued)

Primary Examiner—Steven B Theriault
(74) Attorney, Agent, or Firm—Workman Nydegger

(57) ABSTRACT

"In-situ editing" of a control property within a design surface is provided. "In-situ editing" refers to a feature that can allow a user (e.g., developer) to easily perform multi-pass configuration operations on their user interface (UI) components. This can be achieved by introducing the concept of a new editing mode or view to the integrated development environment (IDE)—(e.g., a Property Editing View (PEV)). The PEV mode can be active. In other words, the user will be presented with a mechanism of viewing and editing all properties without having to move off of the design surface. For example, editing can be performed in-place eliminating the conventional need to enter a property grid.

29 Claims, 13 Drawing Sheets

U.S. PATENT DOCUMENTS

| | | | |
|---|---|---|---|
| 6,750,886 B1 * | 6/2004 | Bergstedt | 715/784 |
| 6,892,360 B1 * | 5/2005 | Pabla et al. | 715/802 |
| 6,907,569 B1 * | 6/2005 | Craft | 715/708 |
| 6,915,491 B2 * | 7/2005 | Hsieh | 715/802 |
| 6,918,090 B2 * | 7/2005 | Hesmer et al. | 715/760 |
| 6,928,625 B2 * | 8/2005 | Makinen | 715/822 |
| 7,000,187 B2 * | 2/2006 | Messinger et al. | 715/705 |
| 7,019,757 B2 * | 3/2006 | Brown et al. | 345/592 |
| 7,047,498 B2 * | 5/2006 | Lui et al. | 715/762 |
| 7,082,577 B1 * | 7/2006 | Brosnahan | 715/860 |
| 7,197,717 B2 * | 3/2007 | Anderson et al. | 715/767 |
| 7,234,118 B1 * | 6/2007 | Bleizeffer et al. | 715/764 |
| 7,343,557 B2 * | 3/2008 | Arend et al. | 715/709 |
| 7,506,256 B2 * | 3/2009 | Baker et al. | 715/708 |
| 7,631,278 B2 * | 12/2009 | Miksovsky et al. | 715/857 |
| 2001/0015718 A1 * | 8/2001 | Hinckley et al. | 345/156 |
| 2002/0154153 A1 * | 10/2002 | Messinger et al. | 345/705 |
| 2002/0158894 A1 * | 10/2002 | Stoll et al. | 345/705 |
| 2003/0174170 A1 * | 9/2003 | Jung et al. | 345/767 |
| 2003/0193481 A1 * | 10/2003 | Sokolsky | 345/173 |
| 2003/0222898 A1 * | 12/2003 | Macomber et al. | 345/709 |
| 2003/0231218 A1 * | 12/2003 | Amadio | 345/861 |
| 2004/0172615 A1 * | 9/2004 | Beltran et al. | 717/113 |
| 2006/0036963 A1 * | 2/2006 | Taylor | 715/768 |

* cited by examiner

PROPERTY INDEPENDENT IN-PLACE EDITING

TECHNICAL FIELD

This invention is related to computer systems and more particularly to a system and/or methodology to effect in-situ (e.g., in-place) editing of a control property within a visual forms designer.

BACKGROUND OF THE INVENTION

Visual user interface (UI) designers (e.g., Visual Basic or Visual Studio.NET brand designers) regularly employ properties in the design process. Design elements generally have properties such as Name, Text, Size, Color, etc. Some of these properties, such as Size or Location can be easily set with the mouse and do not require keyboard input. Other properties (e.g., Name, Text), however, are updated through a Property Browser interface which requires tedious cycles such as "select component", "select property", "set value," etc. This process is extremely time consuming, repetitive and, therefore, inefficient. For example, on a form with UI elements (often referred to as "controls"), users almost always have to change the "Text" and "Name" property for each one of them. A moderately complex form may contain over one hundred controls—this can be a significant task.

Attempts have been made to streamline the editing of properties. Particularly, some designers have set a default property value on a component directly on the design surface rather than in the property browser. This is much like spreadsheet applications (e.g., Excel brand spreadsheet application) that allow a user to type directly into a cell rather than always using the entry bar at the top of the screen. These attempts, however, have been strictly limited to the Text property of the control. As well, support and/or configuration of these attempts is specified by the control itself. In other words, the control specified as to whether it is supported and, if so, for what property. This control dictated method leads to inconsistent user experience and implementation.

Conventional visual forms designers were built to allow a developer to rapidly create applications. More particularly, they were designed to streamline the design process such that a developer would be able to focus on the most salient aspect of the task at hand, without having to do unnecessary work. The ability to layout components on a form in a visual manner, and then customize those components for the application, is one the key parts of the overarching user scenario for an integrated development environment (IDE). An IDE can refer to a set of programs run from a single UI. For example, programming languages often include a text editor, compiler and debugger, which are all activated and function from a common menu.

A part of the customization required of a developer involves examining and setting properties on the constituent components within the application. Some visual designers support this key task very well, however the overall experience can be made even more streamline by addressing one of the key existing workflow issues: toggling between the workflow editor and the design surface. In other words, much of the user's attention should be concentrated on either the design surface or code editor, but unfortunately, for many tasks, the user must spend some time—or in some cases, a great deal of time—"outside" of these primary views to get their job done.

There can be several different phases of application development that a user goes through when creating an application within an IDE. As well, no two developers are likely to progress through the phases in exactly the same order and manner. Nonetheless, usually at one or more discrete periods in the application development cycle for a given application, developers enter a UI creation mode. The tasks within the UI creation phase can include the initial creation of a form or forms to be used by application UI. Accordingly, initial layout, configuration (e.g., property getting/setting) and code wire-up for components on the form must be addressed.

Also, within this UI creation phase, as well as others, there are two predominant approaches to proceeding with the work required: Single-pass and Multi-pass. The Single-pass approach refers to the situation whereby each control is placed on the form, its key properties (e.g., Name, Text) set, event handlers wired-up, etc. before moving on to the next control. On the other hand, Multi-pass refers to the situation whereby all controls are dropped from the visual designer toolbox onto the form in sequence. A developer then makes another pass through the controls to set one or more key properties (e.g., Name on each control, Text on each control), then makes another pass to wire-up event handlers, and so on.

What is needed is a system and/or methodology to make the design experience consistent for users and flexible enough to handle arbitrary properties in a unified way. Reducing the number of "clicks" is important for optimizing the productivity of developers using visual designers. By simplifying or streamlining repetitive tasks, designers allow developers to concentrate on solving business problems rather than doing menial tasks. Therefore, what is needed is a system and/or methodology to further streamline the multi-pass approach of configuring properties in a visual form designer. More particularly, a substantial need exists for a system and/or methodology to eliminate (or streamline) unnecessary steps (e.g., property edit toggling) in the configuration process.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, provides for "in-situ editing" of a control property. "In-situ editing" refers to a feature that can allow a user (e.g., developer) to easily perform multi-pass configuration operations on their user interface (UI) components. This can be achieved by introducing the concept of a new editing mode or view to the integrated development environment (IDE)—(e.g., a Property Editing View (PEV)). The PEV mode can be active. In other words, the user can be presented with a mechanism of viewing and editing all properties without having to move off of the design surface. For example, editing can be performed on the design surface (e.g., in-place) thereby eliminating the conventional need to enter a property grid.

Aspects of this invention can allow the user to enter a "property editing mode" where a property to edit can be selected. This property can be selected from a list that represents the union of all the unique property names of the components (e.g., controls) on a design surface. For the selected property (the default can be "text" or "name"), an overlay can be added above each element on the design surface listing the current value of the property. The user can then quickly navigate (e.g., click or tab) through these overlays setting the current value. In one aspect, by using the tab key and only the keyboard, work flow can be particularly more efficient than having to use a pointing device (e.g., mouse) each time to select the control(s). It will be appreciated that alternative techniques exist to effect navigation. These alternative methods include, but are not limited to, depressing the "Enter" key following an input, "Backspace" key, arrow keys, preprogrammed function keys or the like.

Once editing of the selected property is complete, the user can choose to exit the property editing mode and return to the normal or "layout mode," which is the traditional mode for visual designers. As well, if desired, a designer can choose another property to edit. If another property is chosen, the overlays can be updated with the value for the newly selected property on each control that has the given property and the process repeats. It will be appreciated that, in accordance with the subject invention, any property can be edited in its string representation which can leave the possibility of adding more sophisticated editors for properties such as enums, or colors, etc.

In an accordance with another aspect of the invention, a system that facilitates in-situ (e.g., in-place) editing of a property in a visual designer is provided. The system can include a property selection component that facilitates identifying the property. As described supra, the property selection component can employ a list component to display and thereby assist in effecting the identification and/or selection of the property. The list component can be arranged in any manner known in the art including but, not limited to, a drop-down, pull-down, alphabetical list or the like.

A control selection component that determines a control having the property can be provided. This control selection component can query a designer for a list of controls corresponding to the selected property. Finally, a property edit component that facilitates the in-situ editing of the property corresponding to the control can be provided. The property edit component can facilitate directly editing the property with respect to a desired control within the design surface or form. In other words, this editing component can allow a user to edit the property without having to enter a property grid.

The invention can include an overlay component that displays a current value of the property with respect to the desired control. A navigation component can enable a user to choose a desired control from multiple controls. By way of example, in one aspect, a navigation component can be employed whereby the "Tab" key can transfer the editing focus from one control to another. Once the overlay for the desired control is the subject of the focus, the user can perform in-place editing via the overlay.

In alternate aspects, artificial intelligence (AI) components can be employed to infer or predict a user action(s). By way of example, the AI components can infer or predict a user action(s) based upon historical user criteria. As well, speech command and voice recognition techniques can be employed to effect selection as well as editing functionality of the subject invention.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
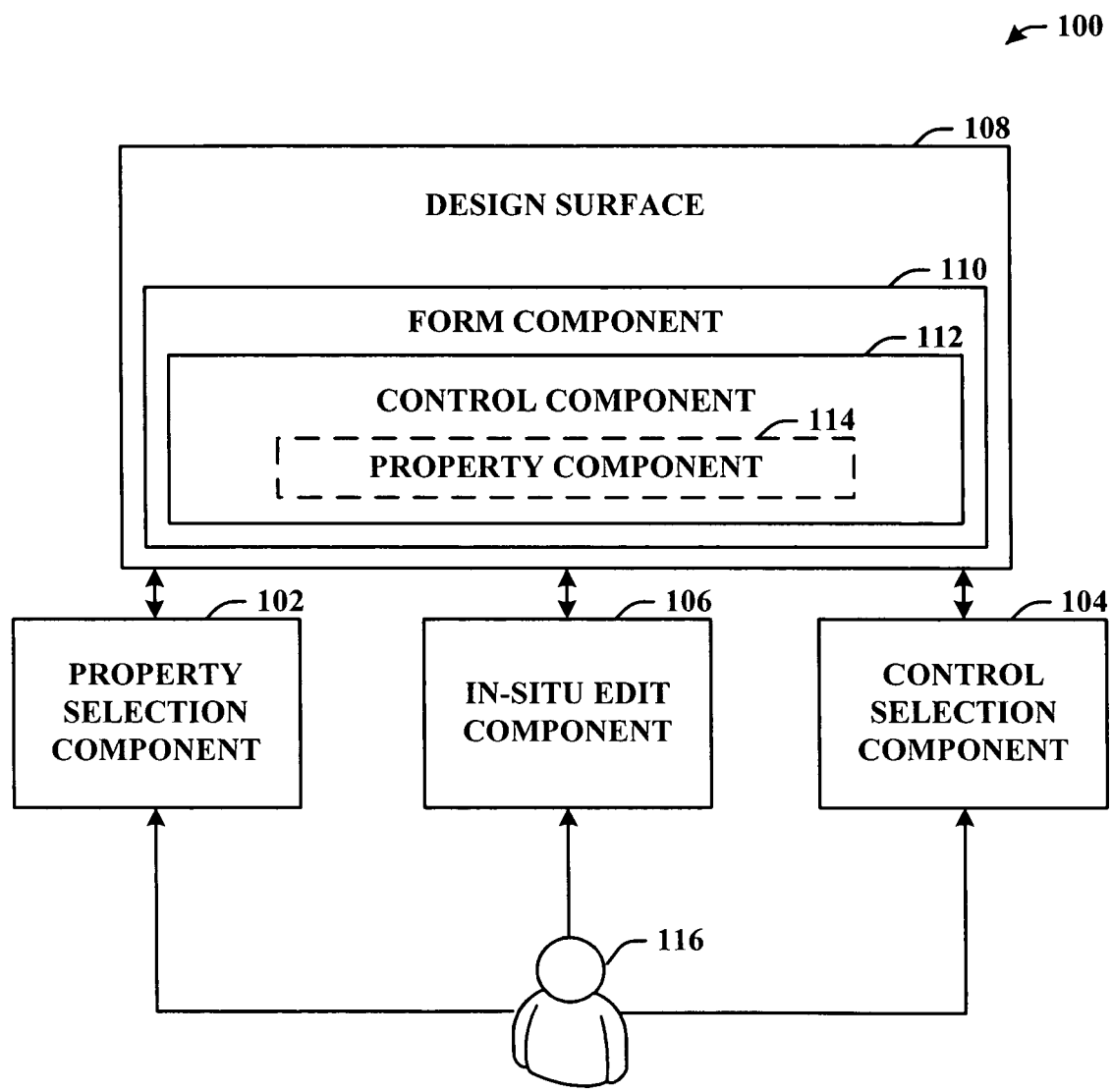
FIG. 1 illustrates a general component block diagram of a system for in-situ editing of a control property in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention is directed to a system and/or methodology that enables "in-situ editing" of a user interface (UI) component. "In-situ editing" can refer to a feature that allows a developer to easily perform multi-pass configuration operations on UI components in-place on the design surface and/or form. In accordance with an aspect of the subject invention, a novel concept of a new editing mode and/or view to the integrated development environment (IDE)—"Property Editing View" (PEV) is described herein. The PEV of the subject invention can be active. In other words, the user can be presented with a mechanism of viewing and editing all control properties without having to move off of the design surface (e.g., to the property grid).

Referring now to FIG. 1, there is illustrated a schematic representation of an aspect of a system 100 that facilitates in-place editing of a control property (e.g., name, text, position, appearance) within a visual form designer in accordance with the subject invention. Generally, the system 100 can include a property selection component 102, a control selection component 104 and an in-situ edit component 106. Illustrated in FIG. 1, the system can further include a design surface 108 having a form 110 thereon. The form can include a control 112 having a property 114 associated therewith. Finally, a user 116 is illustrated to be in communication with the property selection component 102, the control selection component 104 and the in-situ edit component 106.

The property selection component 102 facilitates the user 116 to select a property component (e.g., 114) to edit with respect to a form (e.g., 110). The control selection component 104 can select an appropriate control component (e.g., 112) resident on the form 110 having the selected property (e.g., 114). It will be appreciated that, in one aspect, the system can automatically scan the design surface 108 and/or form 110 in search of a control (e.g., 112), or set of controls, corresponding to a particular selected property (e.g., 114). Although, the described aspect is directed to a single form (e.g., 110), it is to be appreciated that alternate aspects can be employed whereby multiple forms and/or design surfaces can be identified corresponding a selected property and/or control.

For instance, continuing with the example, suppose property component 114 is selected by the user 116. They system can automatically identify control components (e.g., 112) on the subject form 110 as well as other forms within the design surface 108 or alternative design surfaces that correspond to the selected property. This feature would be particularly useful in the case of a global find and replace/modify with respect to a given property corresponding to a specific control.

In operation the in-situ edit component 106, can have three states: View, Edit and Committed (or Middle) mode. The View mode refers to the read-only display when a control is not selected. The Edit mode refers to the editable mode entered when a user selects a control. The Committed or Middle mode refers to the read-only mode after enter or escape (Esc) has been pressed in the editor, but selection remains on the current control. It will be understood that if a user is in Edit mode and presses the Enter key, the changes can be committed to the field unless it violates a constraint (e.g., the user attempts to assign a Name to a control, and a control by that name already exists). Additionally, if a user is in Edit mode and presses the Esc key, the changes can be lost and the field can revert to its previous value. In this situation, the control can remain in Edit mode.

Figure 2:
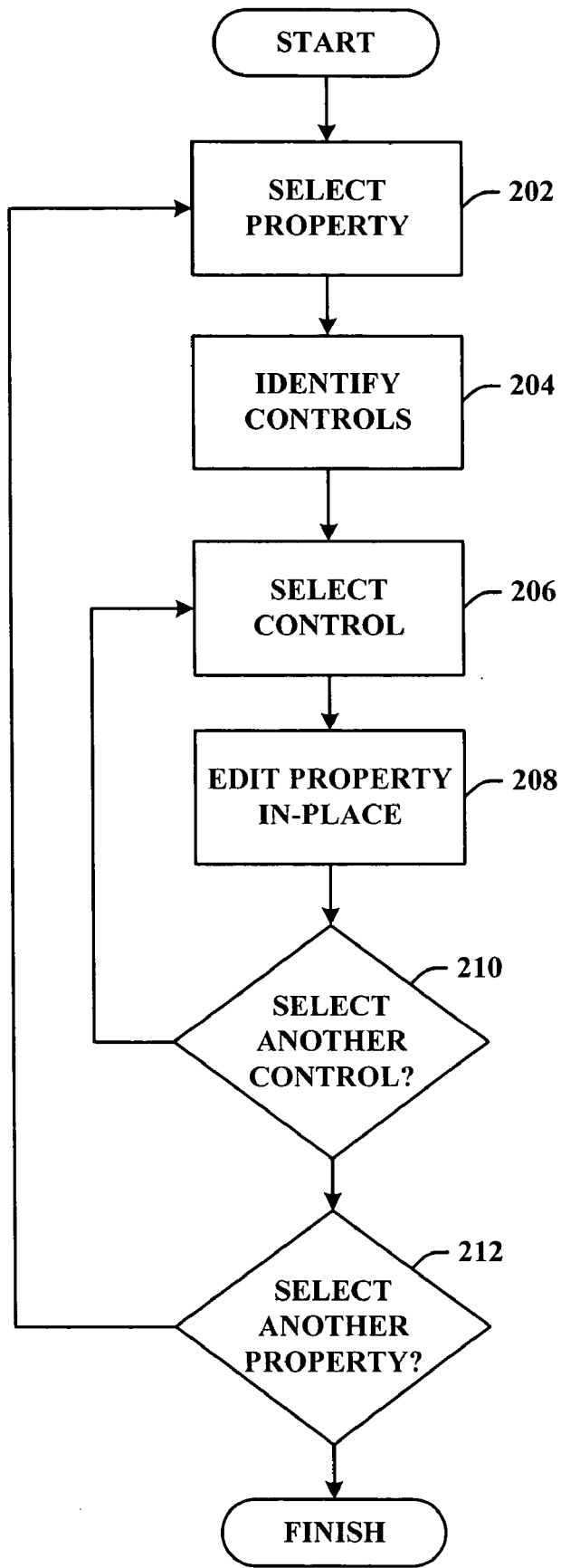
FIG. 2 illustrates an exemplary flow chart of procedures to edit a property value within the design surface of a visual designer in accordance with a disclosed aspect.

Referring now to FIG. 2, there is illustrated a flowchart in accordance with an aspect of the with the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring to FIG. 2 and proceeding to 202, a desired property to edit can be selected. It will be understood that any mechanism can be employed to select a property to edit. For example, assume that a user would like to edit the "text" property. In accordance thereto, the user can select "text" from a property pull down menu thus effecting the selection. At 204, the system can identify a control, or set of controls, that correspond to the selected property. In identifying the controls at 204, the system can query available controls on a design surface or within a designer to determine which controls have the selected property.

At 206, a particular control from the identified controls can be selected. Any mechanism can be employed to effect the selection. For example, the "Tab" function can be employed to scroll through the identified controls. In another aspect, a pointing device can be employed to specify the desired control to edit. In addition to the aforementioned navigational methods described, it is to be appreciated that any mechanism (e.g., arrow keys, "Backspace" key, "Enter" key) can be employed to select a desired control. By way of example, upon completion of an in-situ edit of a property, a designer can depress the "Enter" key thus effecting automatic navigation to a next control to edit. Once identified, in-place editing can occur at 208 with respect to the selected control. In other words, the characteristics of the property with respect to the selected control can be directly manipulated and/or revised within the form and/or design surface. This in-place editing circumvents the need to enter a property grid as described with respect to conventional systems.

At 210, a determination can be made if an additional control is to be edited with respect to the selected property. If so, the system can return to 206 and where another identified control can be selected as illustrated. If additional editing with respect to the selected property is not desired, the system concludes with respect to the initially selected property. At 212, a determination is made if an additional property is to be edited. If so, the system returns to 202 whereby the additional property is selected. If an additional property is not desired, the process ends.

Figure 3:
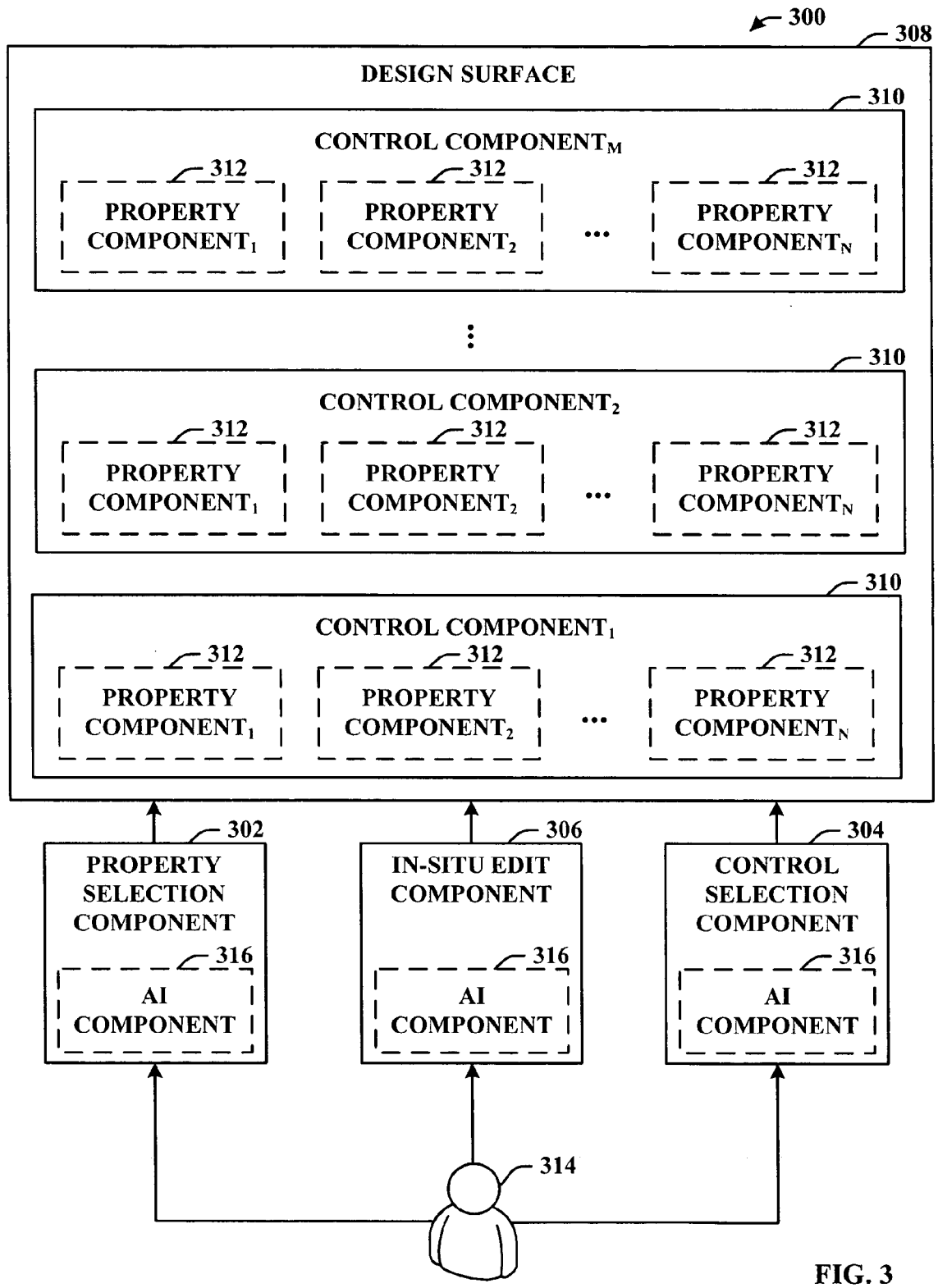
FIG. 3 illustrates a general component block diagram of a system for in-situ editing of a control property that incorporates artificial intelligence (AI) in accordance with an aspect of the subject invention.

Turning now to FIG. 3, there is illustrated a schematic representation of an alternate aspect of the subject invention.

More particularly, a system 300 that facilitates in-place editing of a control property (e.g., name, text, position, appearance) within a visual form designer is shown. The system 300 can include a property selection component 302, a control selection component 304 and an in-situ edit component 306. It will be appreciated that these components (302, 304, 306) have the same functionality as described with reference to like components of FIG. 1.

As illustrated in FIG. 3, the system can further include a design surface 308 having M control components 310 thereon, where M is an integer. Control components 1 to M can be referred to collectively or individually as control component(s) 308. Each control component 308 can have N properties 312 associated therewith, where N is an integer. Property components 1 to N can be referred to collectively or individually as property component(s) 312. Finally, a user 314 is illustrated to be in communication with the property selection component 102, the control selection component 104 and the in-situ edit component 106.

In one aspect, it is to be appreciated that the user 314 can employ the system by selecting a particular property (e.g., 312) to edit. Once selected, as described supra, the user 314 can navigate through control components 310 to identify a desired control 310 to edit. The user 314 can employ the in-place editing of the property (e.g., 312) once the appropriate control (e.g., 310) is selected. It will be understood that automated techniques can be employed to assist or replace any of the user 314 actions described herein without departing from the invention as disclosed and claimed.

The subject invention contemplates alternative two and three-state activation models to effect the system and/or methodology. In other words, although a three-state model, e.g., display/select/edit, is primarily described with respect to the disclosed aspects, it is to be appreciated that a two-state model can be employed in alternate aspects. More particularly, with regard to the disclosed three-state aspect, a designer can select a component, use the arrow keys to navigate and start typing when ready to edit. On the other hand, a two-state model (e.g., display/edit) can be employed, but does not permit the use of the arrow keys. It will be understood that this is because the edit functionality of the two-state model can effect the horizontal (e.g., left and right) arrow keys.

FIG. 3 is provided to add context to the invention. More particularly, FIG. 3 is provided to illustrate that any number of control components 310 can reside on a design surface at any time. Further, each control component 310 can have associated therewith, any number of properties 312. As described supra, once a selection is made regarding the property 312 to edit, a user can toggle through the control components 310 in order to effect in-place editing of the appropriate property 312 with respect to the appropriate or desired control component 310.

In an alternate aspect, a user 314 can first select a particular control component 310 to edit. Once identified, the user 314 can toggle through all properties 312 associated with the control component 310. Thus, multiple properties 312 can be edited (e.g., in-place) in accordance with the specific control component 310. By way of example, suppose a user would like to change the name and text properties with respect to a button control. In this example, the user could select the button control and toggle through the control's respective properties. Upon reaching the "Name" and "Text" properties, the user can perform in-place editing of the properties thereby modifying the button control accordingly.

Continuing with the example of FIG. 3, an optional artificial intelligence (AI) component 316 can be employed to automate, infer and/or predict actions in connection with the property selection component 302, the control selection component 304 and/or the in-situ edit component 306. In accordance therewith, the optional AI component 316 can facilitate automatically performing various aspects (e.g., property selection, control selection, in-situ editing) of the subject invention as described herein. The AI component 316 can optionally include an inference component that can further enhance automated aspects of the AI component utilizing, in part, inference based schemes to facilitate inferring intended actions to be performed at a given time and/or state. The AI-based aspects of the invention can be effected via any suitable machine-learning based technique and/or statistical-based techniques and/or probabilistic-based techniques.

The subject invention (e.g., in connection with in-situ editing of a property) can optionally employ various artificial intelligence based schemes for automatically carrying out various aspects thereof. Specifically, artificial intelligence component 316 can optionally be provided to implement aspects of the subject invention based upon artificial intelligence processes (e.g., confidence, inference). For example, a process for determining the property or order of editing of properties with respect to control can be facilitated via an automatic classifier system and process. Further, the optional artificial intelligence component 316 can be employed to facilitate an automated process of editing in accordance with project characteristics whereby controls corresponding to a specific type can be edited in a particular manner and/or order.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative aspects whereby, based upon a learned or predicted user intention, the system can prompt for verifications of modifications to a property. Likewise, an optional AI component could prompt a user to prior to deleting a value of a property. Moreover, AI can be used to search for commonality of controls or components.

By way of further example, voice recognition techniques can be employed to prompt actions to be performed by the components of the system. For instance, a user can employ voice commands to instruct an action (e.g., to select a specific property). The system, in turn, can respond by executing the action (e.g., selecting the property in response to the voice command). It will be appreciated that any action described in connection to the subject invention can be initiated and/or generated via voice recognition techniques.

Figure 4:
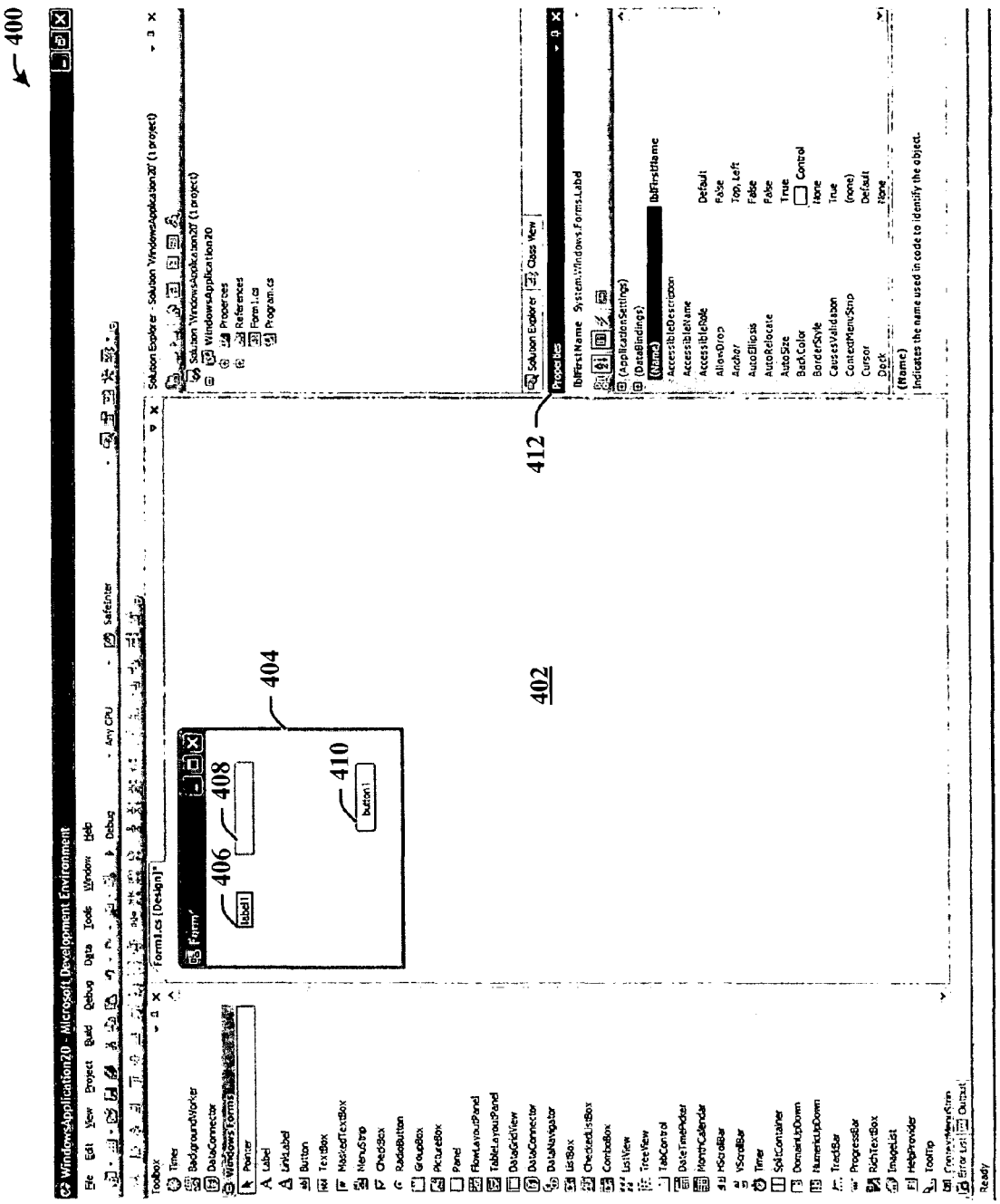
FIG. 4 illustrates a graphical user interface (GUI) that exemplifies a design surface with a form having three controls thereon in accordance with an aspect of the invention.

With reference now to FIG. 4, there is illustrated an exemplary UI graphical description to provide context to aspects of the subject invention. While, for purposes of simplicity of explanation, the one or more UI's shown herein, e.g., in the form of a UI graphical description, are shown and described as an exemplary arrangement. It is to be understood and appreciated that the subject invention is not limited to any characteristics of the UIs, as some characteristics may, in accordance with the subject invention, appear differently from those shown and described herein. Moreover, not all illustrated characteristics may be required to implement the subject invention.

More particularly, the UI of FIG. 4 can provide more detail with regard to an aspect of the subject invention. Illustrated in the UI screen print of FIG. 4, a design surface 402 includes an exemplary form 404. The form 404 includes three custom controls (406, 408, 410). More particularly, the form 404 includes a label control 406, a text box control 408 and a button control 410. Illustrated in the lower right corner of the exemplary UI 400, a "Properties" grid 412 is illustrated. This property grid 412 can, as in accordance with conventional implementations, be employed to edit properties associated with the controls (406, 408, 410) resident on the form. However, because of the number of "clicks" required to edit a property via the property grid 412, the subject invention employs an "in-place" editing functionalilty.

Figure 5:
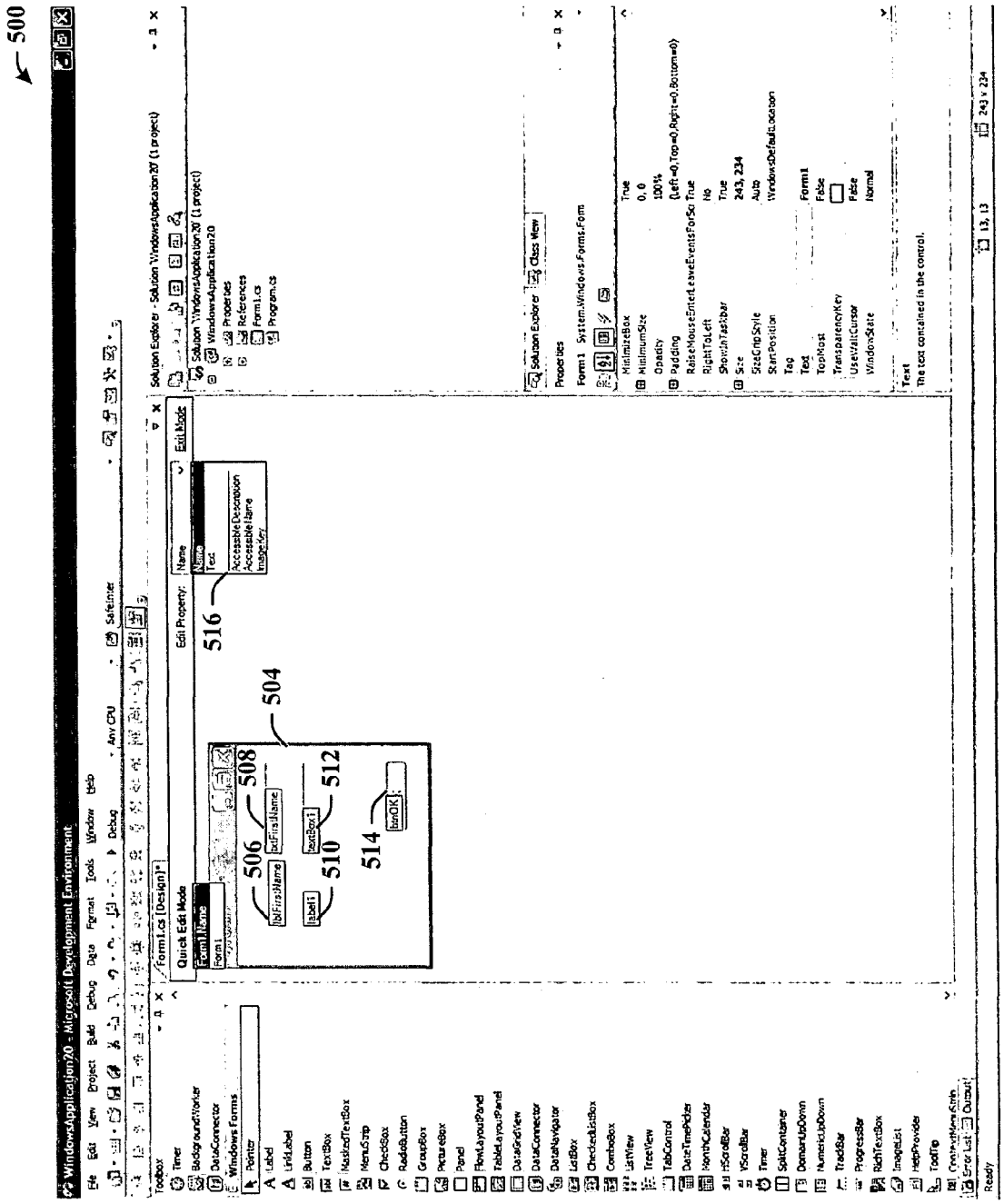
FIG. 5 illustrates a GUI that exemplifies a design surface and form that emphasizes a drop-down property list in accordance with an exemplary aspect.

Turning now to FIG. 5, there is illustrated an exemplary UI screen print to provide further context to aspects of the subject invention. More particularly, the exemplary UI 500 of FIG. 5 illustrates an aspect of the novel "in-place" editing provided by the subject invention. A design surface 502 is provided having a form 504 thereon. In the example, the form 504 includes five controls (506, 508, 510, 512, 514). Although the exemplary form 504 includes five controls, it will be understood that any number of controls can be employed without departing from the scope of the invention.

As discussed supra, a user can enter, or launch, the PEV mode thus initiating the "in-place" editing feature. In one aspect, a user can right click on the design surface 502 to launch the PEV mode. Other launching techniques can be used without departing from the spirit and/or scope of the subject invention. Continuing with the aspect of FIG. 5, once the PEV mode is launched, a user can select a property to edit. For example, the pull-down menu 516 can be employed to select a particular property. It is to be understood that the pull-down menu can be populated with all properties associated with all controls on a form or design surface.

As illustrated, the user can select the "Name" property from the pull-down menu 516. Once selected, the "Tab" key, or other navigational mechanism, can be used to toggle between the controls on the form 504 whereby, the "Name" property can be modified in sequence with regard to each control. Although, "Name" and "Text" are the only two properties shown in the pull-down menu 516, it is to be appreciated that the subject invention can be employed to input, modify and/or delete any property associated with a particular control.

Figure 6:
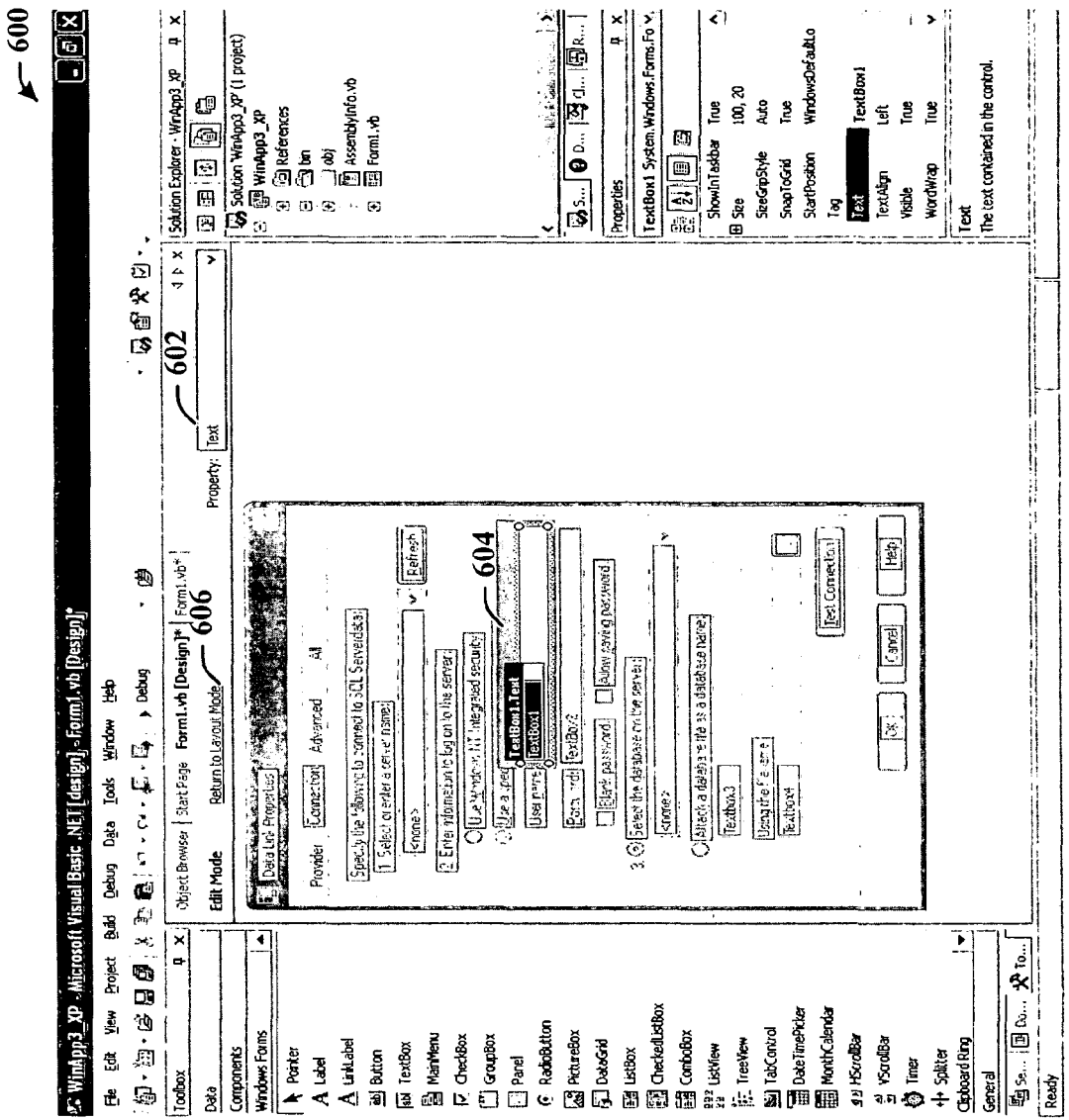
FIG. 6 illustrates a GUI that exemplifies a design surface and form having an overlay in accordance with an exemplary aspect.

In an alternate aspect of FIG. 6, as described supra, the subject invention enables a user to enter a "property editing mode" whereby a property corresponding to a selected control can be in-place edited. FIG. 6 illustrates an exemplary UI 600 to provide additional context to the in-place editing functionality. By way of example, the property (e.g., text, name, position, color) can be selected from a list 602 that represents the union of all the unique property names of the components on the design surface. As discussed supra, the list can be displayed in any manner including, but not limited to, a drop or pull down or the like.

For a selected property (e.g., text), an overlay 604 be can added above each element (e.g., control) on the design surface having the selected property. Additionally, the overlay 604 can default to the property's current value. As shown in the example of FIG. 6, the default "text" value is "TextBox1." It will be appreciated that a default property (e.g., name, text) can be preset to further streamline the in-place edit function.

As previously described, a user can quickly click or tab through these overlays 604 thereby setting the current value in-place. In one aspect, by using the tab key (or other desired navigation technique (e.g., arrow keys, "Enter" key following input, "Backspace" key) and only the keyboard, workflow can be much smoother and efficient than having to use a pointing device (e.g., mouse) each time to select a specific control(s). However, it will be appreciated that a pointing device can be employed as a navigational technique without departing from in-place editing novelty. Further, as illustrated in FIG. 6, the overlay 604 can employ a bounding box and highlight. In other words, an aspect of the invention can employ a bounding box and highlight as shown in overlay 604 which can facilitate a user to quickly identify the control being edited. As illustrated, other non-selected controls on the form can be faded into the background such that a user could quickly focus on the control at issue.

By clicking "Return to Layout Mode" 606 the user can then choose to exit the mode and return to "layout mode," which is the traditional mode for visual designers, or pick another property to edit. If another property is chosen from the pull down 602, the overlays 604 will update with the value for that property on each control that has the given property and the process repeats. Although, aspects described herein are directed to editing the name and/or text properties, it is to be appreciated that any property can be edited in accordance with alternate aspects. For example, the subject invention can be employed in connection with in-place editing of properties including, but not limited to, color, position, font type, or the like.

The following scenarios are included to provide context to the subject invention. The scenarios are provided to describe aspects of the invention and are not intended to limit the subject invention in any way. Those skilled in the art will appreciate that additional scenarios can exist which include features and functions described herein.

Figure 7:
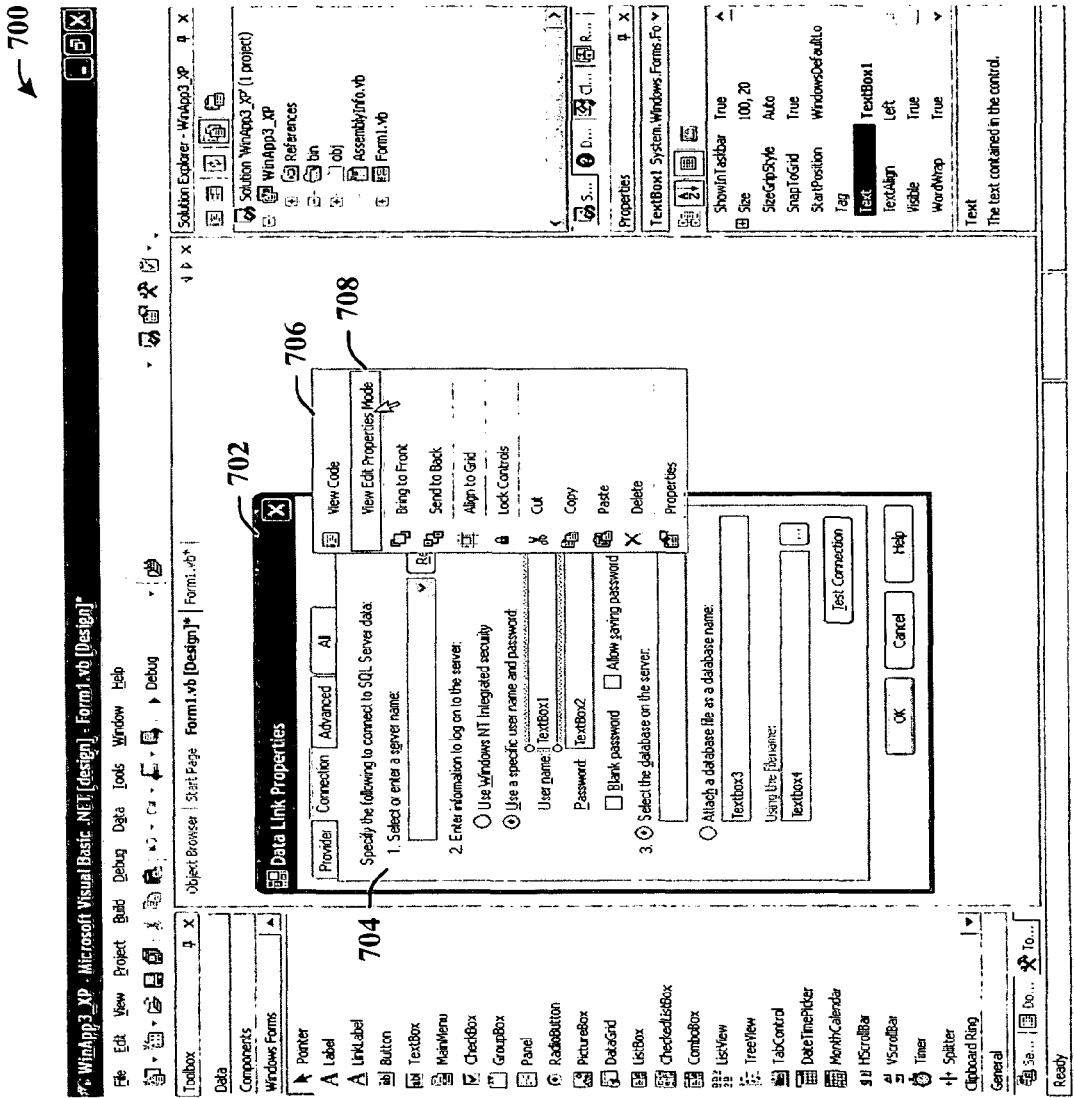
FIG. 7 illustrates a GUI that exemplifies a design surface that emphasizes a technique to launch a property editing mode in accordance with an exemplary aspect.

With reference to FIG. 7, the exemplary scenario is directed toward entering the PEV. Suppose, a user has created a TabControl 702 with multiple TabPages. The user has laid out the controls on the current TabPage 704 (e.g., Connection), and now wishes to change the Text property on some of the controls. Additionally, he wishes to change other properties such as the Name, Color, etc.

Figure 8:
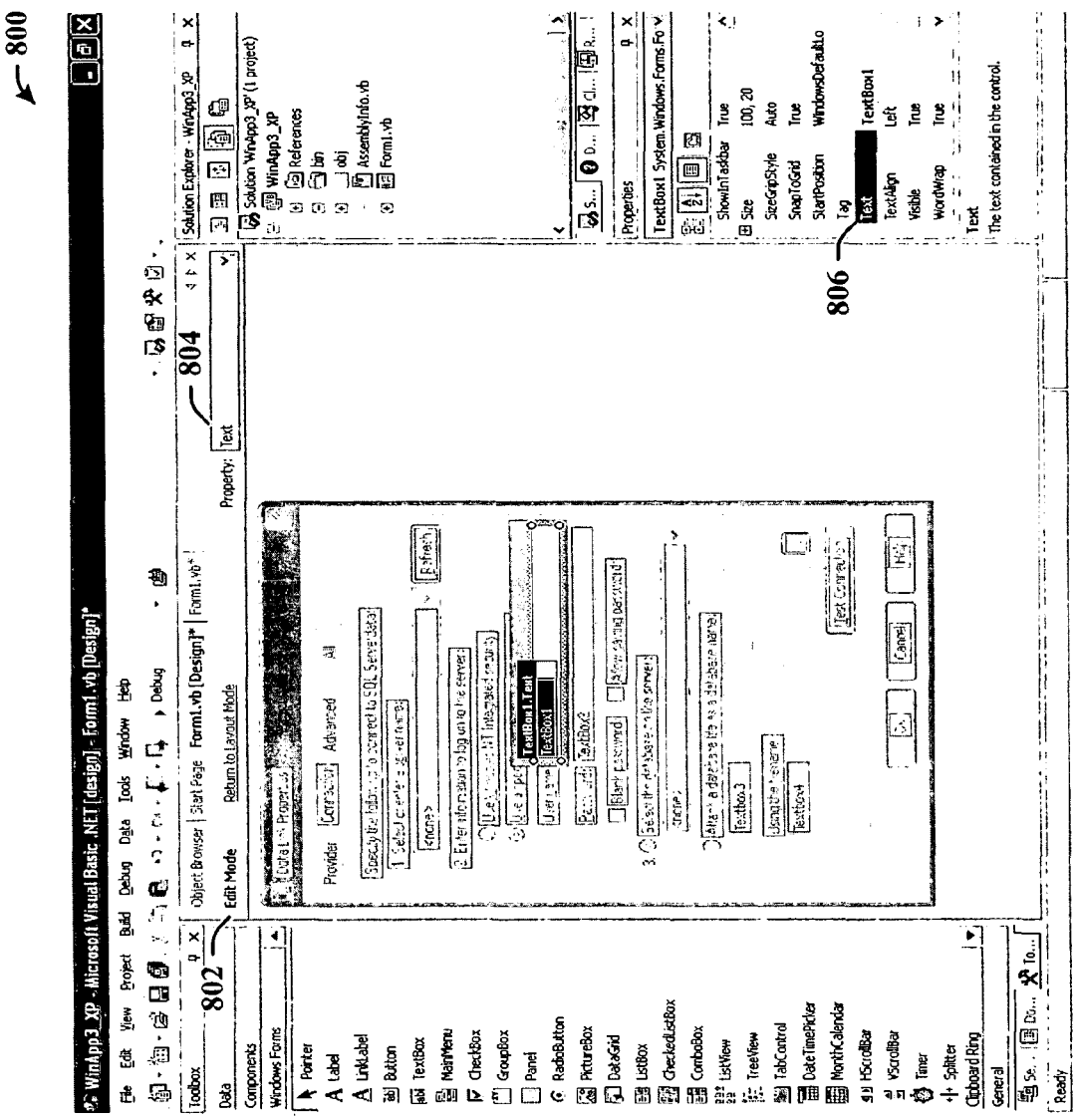
FIG. 8 illustrates a GUI that exemplifies a design surface that emphasizes a property editing mode toolbar in accordance with an exemplary aspect.

In order to accomplish this task, the user randomly right-clicks on the surface of the form 702. This action launches the Property Editing window 706. The user selects the View Edit Properties Mode 708, the context menu commits, and the PEV is entered. The user knows this because the PEV title bar "grows" down from the top of the form, reflowing his design surface somewhat to make room. FIG. 8 illustrates the PEV title bar 802. As shown, the PEV title bar 802 includes a property drop down 804 whereby the user can select a desired property to edit as discussed supra.

Figure 9:
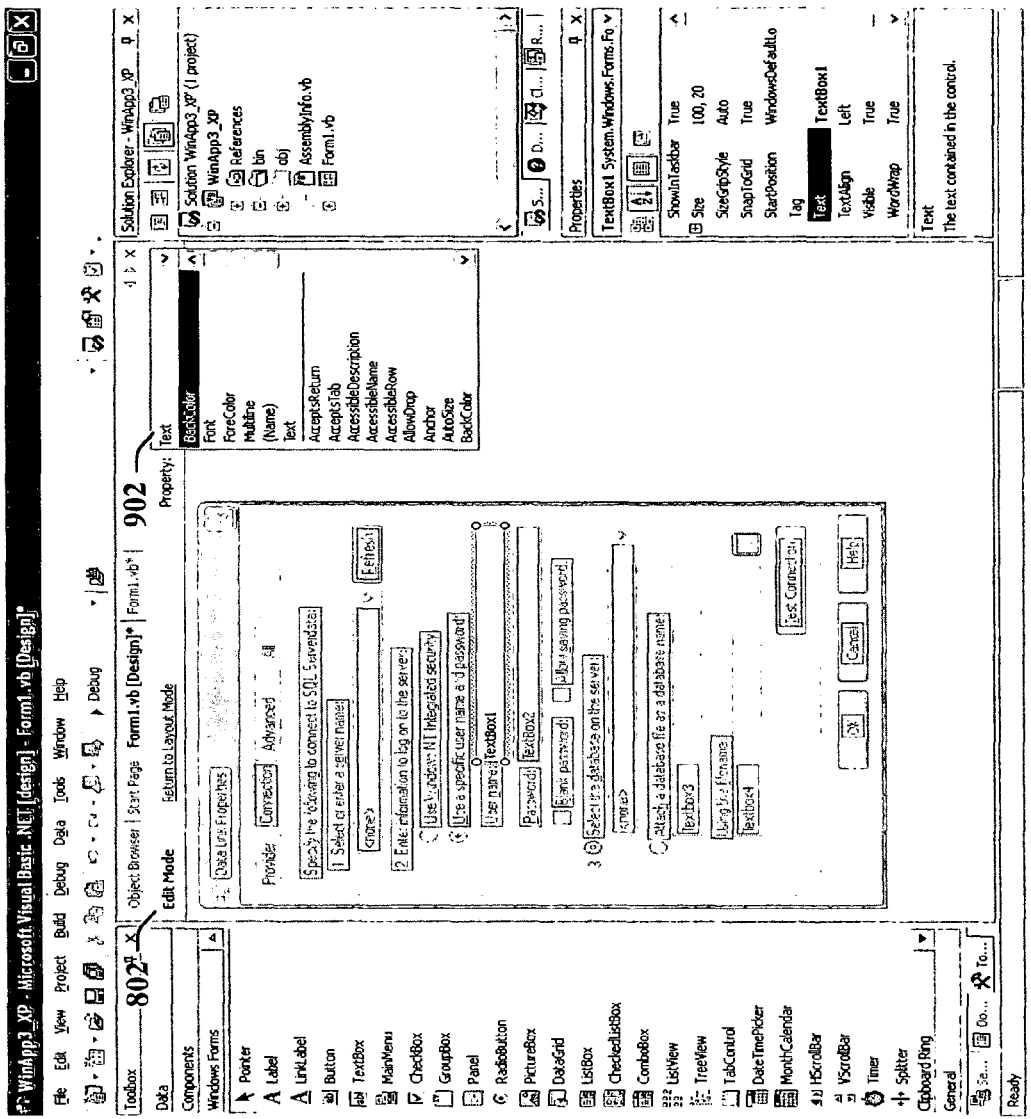
FIG. 9 illustrates a GUI that exemplifies a design surface that emphasizes a property list pull-down and overlay in accordance with an exemplary aspect.

Continuing with the example, and with reference to in-place editing of the property values within PEV, FIG. 8 illustrates that the same control (e.g., TextBox1) that was selected before entering the PEV mode is selected. Accordingly, the rest of the screen can be "grayed out" significantly as shown. The text in the PEV entry textbox is selected, therefore if the user types into the box, his action will be editing the property indicated in the edit box caption 806 (e.g., the Text property). He types "txtUserName" and hits enter. The property value updates in the Property Grid, but the control remains selected (though the insertion bar or selection highlight has disappeared) as illustrated by FIG. 9.

In order to navigate to a different control within PEV, the user can now tab to or point and click on another control's edit box. Thereafter, the newly selected control becomes selected as in the above screenshot of FIG. 8. He types another value, then clicks "Enter." It will be appreciated that alternate methods of navigation can be employed in connection with the subject invention. For example, the arrow keys can be utilized to move the active status to the next control in Tab order. These keyboard navigational methods enable a user to set the Text property of respective controls, without having to use the mouse or pointing device at all.

Figure 10:
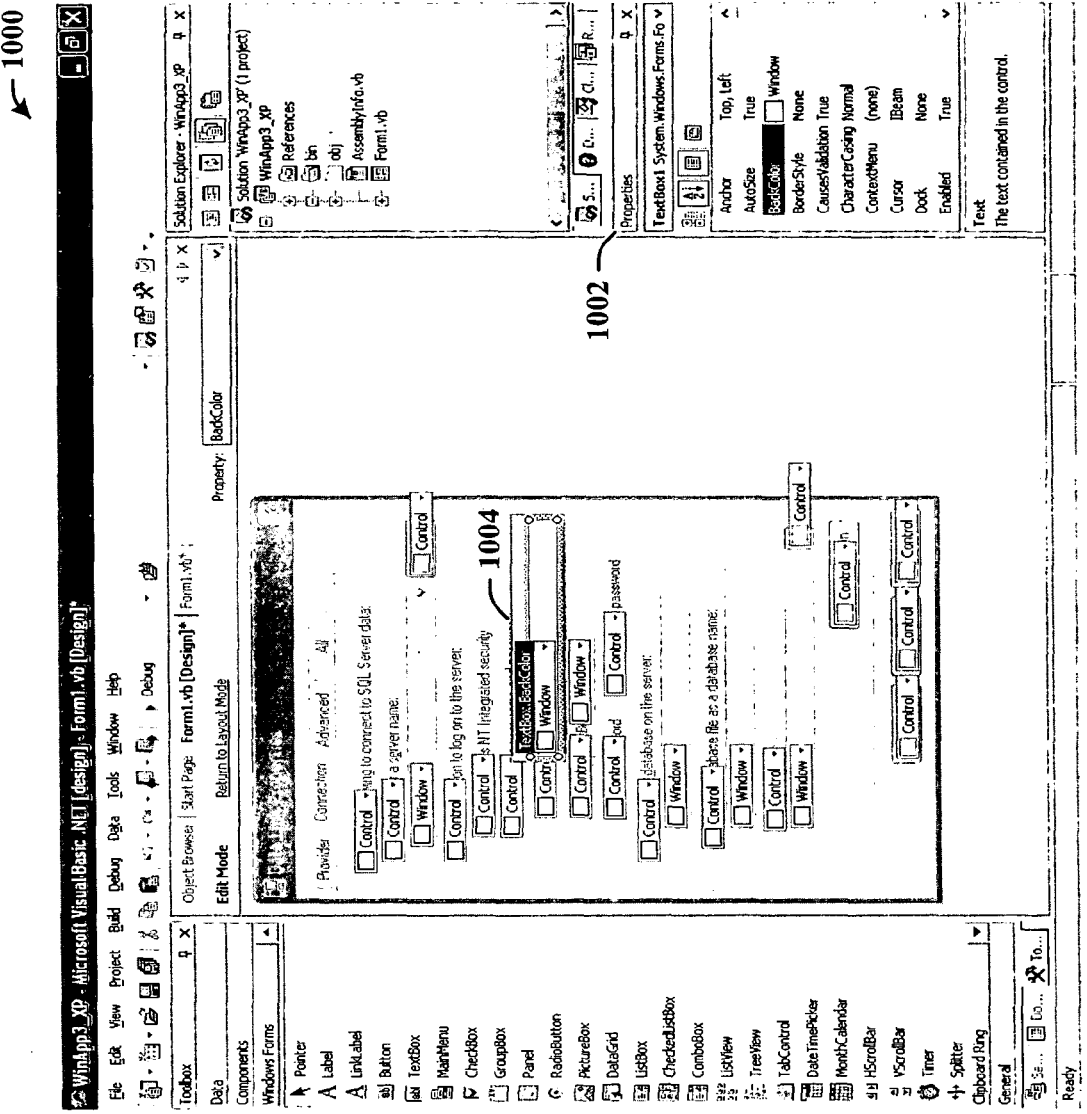
FIG. 10 illustrates a GUI that exemplifies a design surface that emphasizes an alternate overlay technique in accordance with an exemplary aspect.

Continuing with the scenario and again with reference to FIG. 9, an additional property can be selected for editing. The user would now like to now edit the "BackColor" of some of his controls. He notices the drop down menu 902 on the PEV title bar 802. By clicking on the drop down menu 902, the user is able to select the BackColor property 902 from the list. Accordingly, the designer surface changes as shown in FIG. 10.

Figure 11:
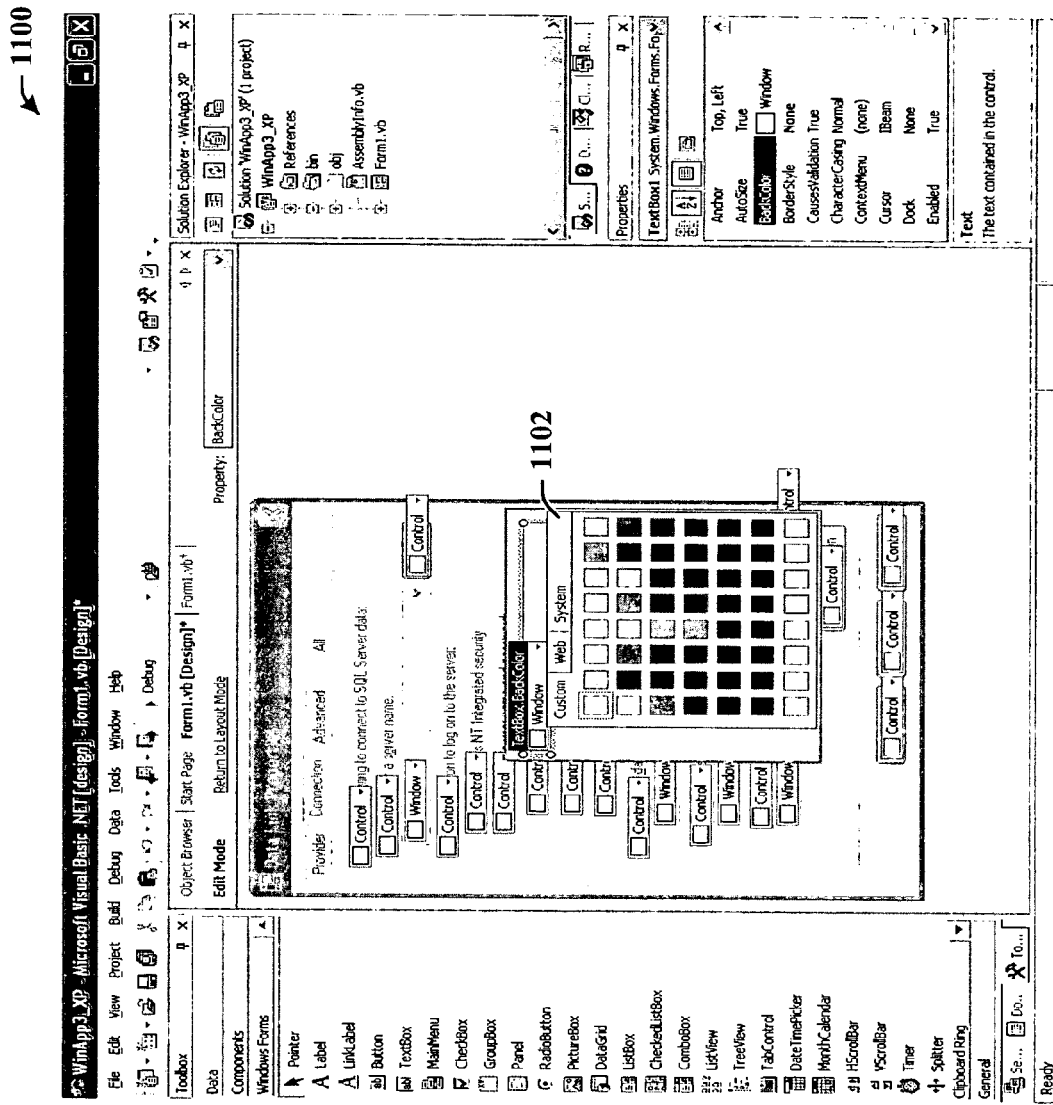
FIG. 11 illustrates a GUI that exemplifies a design surface that emphasizes a color pallet to in-place edit a property in accordance with an exemplary aspect.

The user notes that the BackColor value is being displayed on the surface, and that the Property Grid 1002 also now has BackColor selected. The user clicks the dropdown glyph 1004 on the TextBox he desires to modify. Accordingly, as shown in FIG. 11, a color pallet 1102 is displayed thereby indicating active editing mode. The user can in-place choose a desired BackColor color from the pallet 1102. The user selects a color, sees that it is committed (the unactivated editor displays the new value), and he can see the background color change in the TextBox despite the control being "grayed out" or dithered. Once the user has completed all of his desired in-place property edits via PEV, he can return to the "normal" or "layout" mode by clicking the "Return to Layout Mode" on the title bar.

Figure 12:
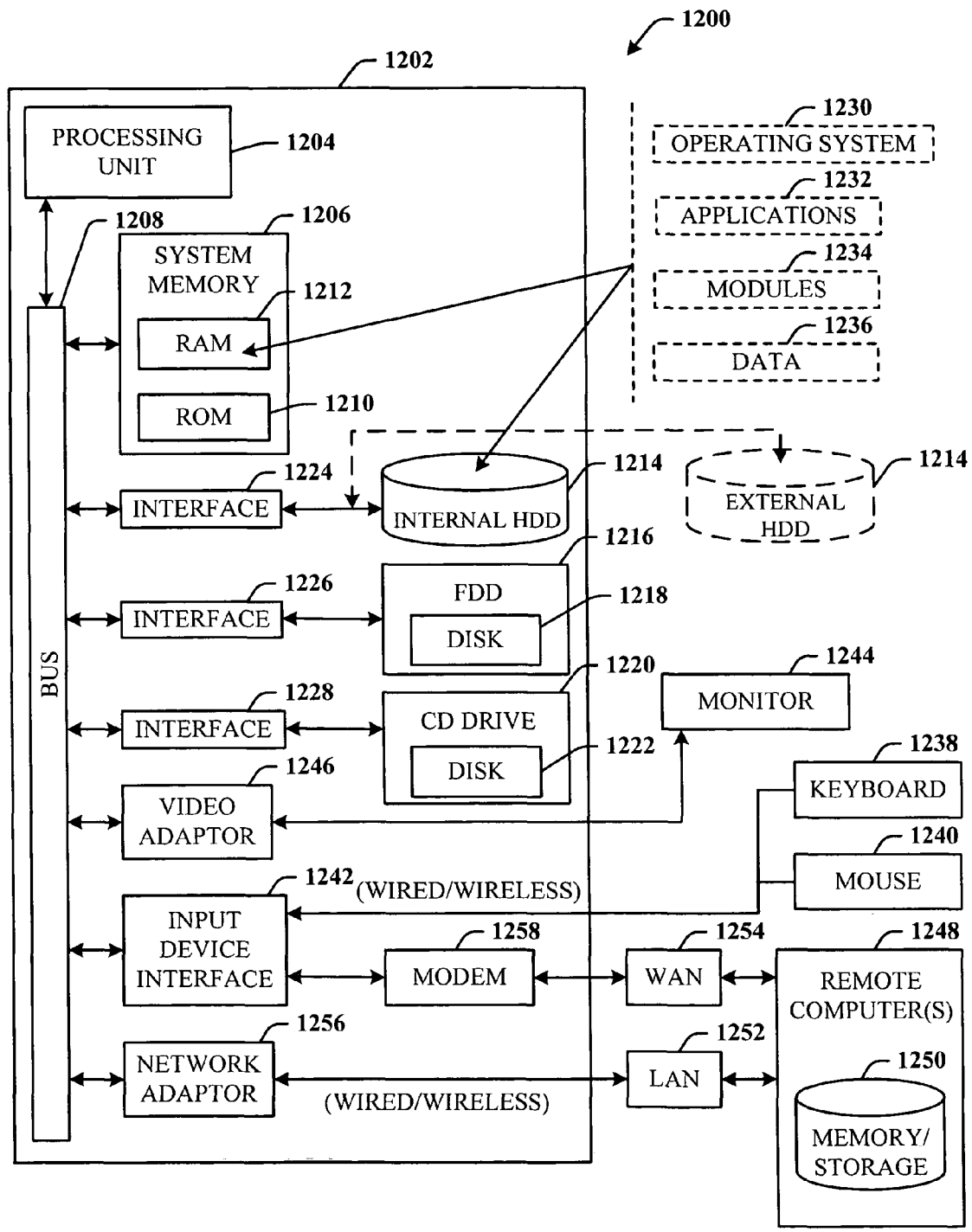
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the subject invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
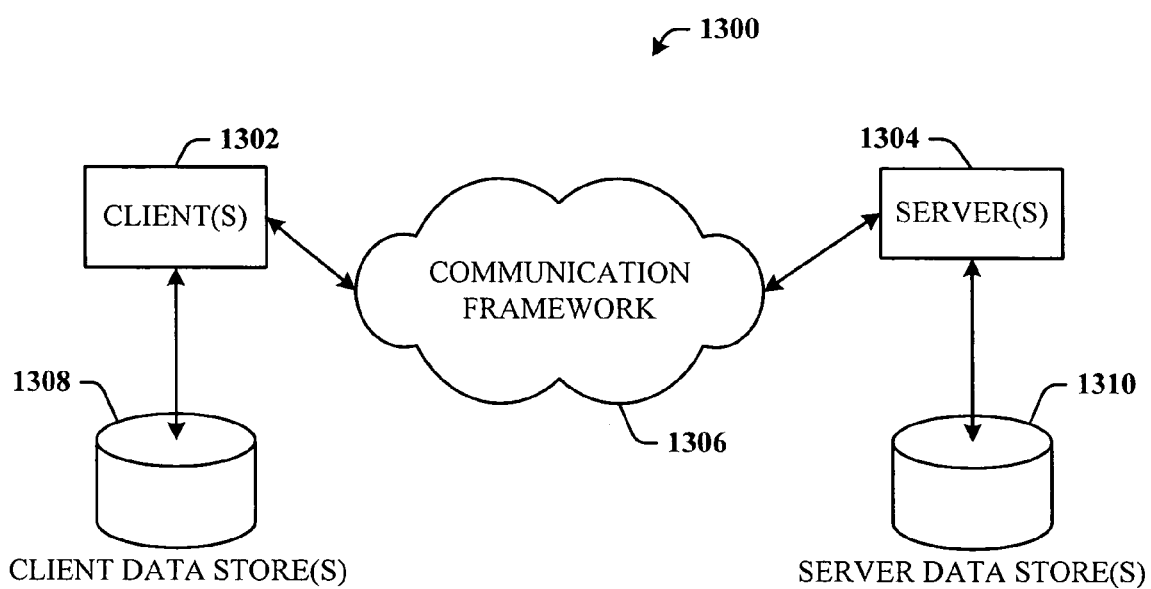
FIG. 13 illustrates a schematic block diagram of an exemplary computing environment in accordance with the subject invention.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the subject invention, for example. The system 1300 also includes one or more server(s) 1304. The server(s) 1304 can also be hardware and/or software (e.g., threads, processes, computing devices). The servers 1304 can house threads to perform transformations by employing the subject invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A program storage medium readable by a computer having a memory and a processor, the medium tangibly embodying one or more programs of instructions executable by the computer to implement a system that facilitates in-situ editing of a property in a form displayed in a visual designer, the system comprising:
    a property selection component that presents one or more properties associated with those controls that are part of the form, facilitating selection of the property;
    a control selection component that receives a property selection from a visual designer user and, based on the property selection, determines which of the controls on the form has the selected property;
    an overlay component that simultaneously and selectively displays a separate graphical overlay on top of each control on the form that has the selected property such that multiple separate graphical overlays are displayed on the form at the same time, each corresponding to an individual control that has the selected property, the graphical overlays comprising a current value for each control having the selected property such that each separate graphical overlay is configured to display a different, individually determined value at each separate control, wherein upon selection of a second, different property, the multiple separate graphical overlays corresponding to each control having the newly selected different property are updated with the current property values for each corresponding control and the previously displayed graphical overlays that do not have the newly selected different property are removed from display; and
    a property edit component that facilitates the in-situ editing of the property corresponding to the one or more controls, where in-situ editing of the property is performed on the design surface of the visual designer, such that the user can toggle between the various graphical overlays and edit property values for each control via the graphical overlay, thereby eliminating any need for the user to leave the design surface to enter a property grid.

2. The system of claim 1, further comprising a list component that represents a union of a plurality of property names on a design surface; the property selection component facilitates identifying the property from the list.

3. The system of claim 2, the list component is a drop down list.

4. The system of claim 1, the property edit component includes a navigation component that facilitates choosing the control.

5. The system of claim 1, the property is a default property.

6. The system of claim 1, the property is name.

7. The system of claim 1, the property is text.

8. A computer that employs the system of claim 1.

9. The system of claim 1, further comprising an artificial intelligence (AI) module that predicts a user action.

10. The system of claim 9, the AI component includes an inference component that infers the user action as a function of historical user criteria.

11. The system of claim 10, the inference component employs utility-based analyses in performing the inference.

12. The system of claim 9, the AI component employs a statistical-based analysis to infer an action that the user desires to be automatically performed.

13. The system of claim 1, at least two of the property selection component, the control selection component, and the in-situ edit component are incorporated into a common component.

14. A method of in-situ editing of a property of a form on a design surface of a visual designer, the method comprising:
    identifying the property that associated with one or more controls that are part of the form;
    receives a property selection from a user;
    based on the property selection, determining which of the one or more controls on the form has the property;
    simultaneously and selectively displaying a separate graphical overlay on top of each control on the form that has the selected property such that multiple separate graphical overlays are displayed on the form at the same time, each corresponding to an individual control that has the selected property, the graphical overlays comprising a current value for each control having the selected property such that each separate graphical overlay is configured to display a different, individually determined value at each separate control, wherein upon selection of a second, different property, the multiple separate graphical overlays corresponding to each control having the newly selected different property are updated with the current property values for each corresponding control and the previously displayed graphical overlays that do not have the newly selected different property are removed from display; and
    editing the property corresponding to the one or more controls, editing of the property occurs in-situ on the design surface, such that the user can toggle between the various graphical overlays and edit property values for each control via the graphical overlay, thereby eliminating any need for the user to leave the design surface to enter a property grid.

15. The method of claim 14, that the act of displaying the current value includes displaying an overlay corresponding to each control.

16. The method of claim 14, further comprising compiling a list that represents a union of a plurality of property names on the design surface.

17. The method of claim 16, further comprising selecting the property from the list.

18. The method of claim 14, the act of determining the control includes navigating to the control.

19. The method of claim 14, further comprising inferring a user action.

20. A computer readable medium having stored thereon computer executable instructions for carrying out the method of claim 14.

21. A program storage medium readable by a computer having a memory and a processor, the medium tangibly embodying one or more programs of instructions executable by the computer to implement a system that facilitates in-place editing of a property in a form displayed on a design surface of a visual editor, the system comprising:
   means for selecting the property from a list that represents a union of all properties in the form on the design surface;
   means for receiving a property selection from a user;
   means for identifying at least one control on the form having the property, based on the property selection;
   means for simultaneously and selectively displaying a separate graphical overlay on top of each control on the form that has the selected property such that multiple separate graphical overlays are displayed on the form at the same time, each corresponding to an individual control that has the selected property, the graphical overlays comprising a current value for each control having the selected property such that each separate graphical overlay is configured to display a different, individually determined value at each separate control, wherein upon selection of a second, different property, the multiple separate graphical overlays corresponding to each control having the newly selected different property are updated with the current property values for each corresponding control and the previously displayed graphical overlays that do not have the newly selected different property are removed from display; and
   means for editing the property in-place in a form on the design surface, such that the user can toggle between the various graphical overlays and edit property values for each control via the graphical overlay, thereby eliminating any need for the user to leave the design surface to enter a property grid.

22. The system of claim 21, further comprising means for compiling the list.

23. The system of claim 21, further comprising means for navigating to the control.

24. A program storage medium readable by a computer having a memory and a processor, the medium tangibly embodying one or more programs of instructions executable by the computer to implement a system that facilitates in-place editing of a property within a form on a design surface, the system comprising:
   a property selection component that queries available controls on a design surface to determine properties associated with the controls and presents a list representing all of the determined properties that are part of the form;
   a control selection component that facilitates selecting a property from the list and identifies which of the controls on the form on the design surface have the selected property;
   a property edit component simultaneously and selectively displays a separate graphical overlay on top of each control on the form that has the selected property such that multiple separate graphical overlays are displayed on the form at the same time, each corresponding to an individual control that has the selected property, the graphical overlays comprising a current value for each control having the selected property such that each separate graphical overlay is configured to display a different, individually determined value at each separate control, wherein upon selection of a second, different property, the multiple separate graphical overlays corresponding to each control having the newly selected different property are updated with the current property values for each corresponding control and the previously displayed graphical overlays that do not have the newly selected different property are removed from display, wherein each current value overlay facilitates in-situ editing of the property associated with the selected current value overlay; and
   a navigation component that facilitates navigating from one current value overlay to the next current value overlay, such that the user can toggle between the various graphical overlays and edit property values for each control via the graphical overlay, thereby eliminating any need for the user to leave the design surface to enter a property grid.

25. A program storage medium readable by a computer having a memory and a processor, the medium tangibly embodying one or more programs of instructions executable by the computer to implement a system that facilitates in-situ editing of a property in a visual designer, the system comprising:
   a control selection component that receives a property selection from a visual designer user and, based on the property selection, facilitates determination of which controls on the form have a given property;
   a display component that simultaneously and selectively displays on a design surface of the visual designer a separate graphical overlay on top of each control on the form that has the selected property such that multiple separate graphical overlays are displayed on the form at the same time, each corresponding to an individual control that has the selected property, the graphical overlays comprising a current value for each control having the selected property such that each separate graphical overlay is configured to display a different, individually determined value at each separate control, wherein upon selection of a second, different property, the multiple separate graphical overlays corresponding to each control having the newly selected different property are updated with the current property values for each corresponding control and the previously displayed graphical overlays that do not have the newly selected different property are removed from display; and
   a property edit component that facilitates the in-situ editing of the property corresponding to the control, in-situ editing of the property is performed via the display component on the design surface of the visual designer, such that the user can toggle between the various graphical overlays and edit property values for each control via the graphical overlay, thereby eliminating any need for the user to leave the design surface to enter a property grid.

26. The system of claim 25, further comprising a property selection component that facilitates selecting the property from a list; the list represents a union of a plurality of property names on a design surface.

27. The system of claim 25, the property edit component includes an automatic navigation component that facilitates automatically navigating to a next control.

28. A computer that employs the system of claim 25.

29. The system of claim 25, further comprising an artificial intelligence (AI) module that predicts a user action.

* * * * *